Figure 1:
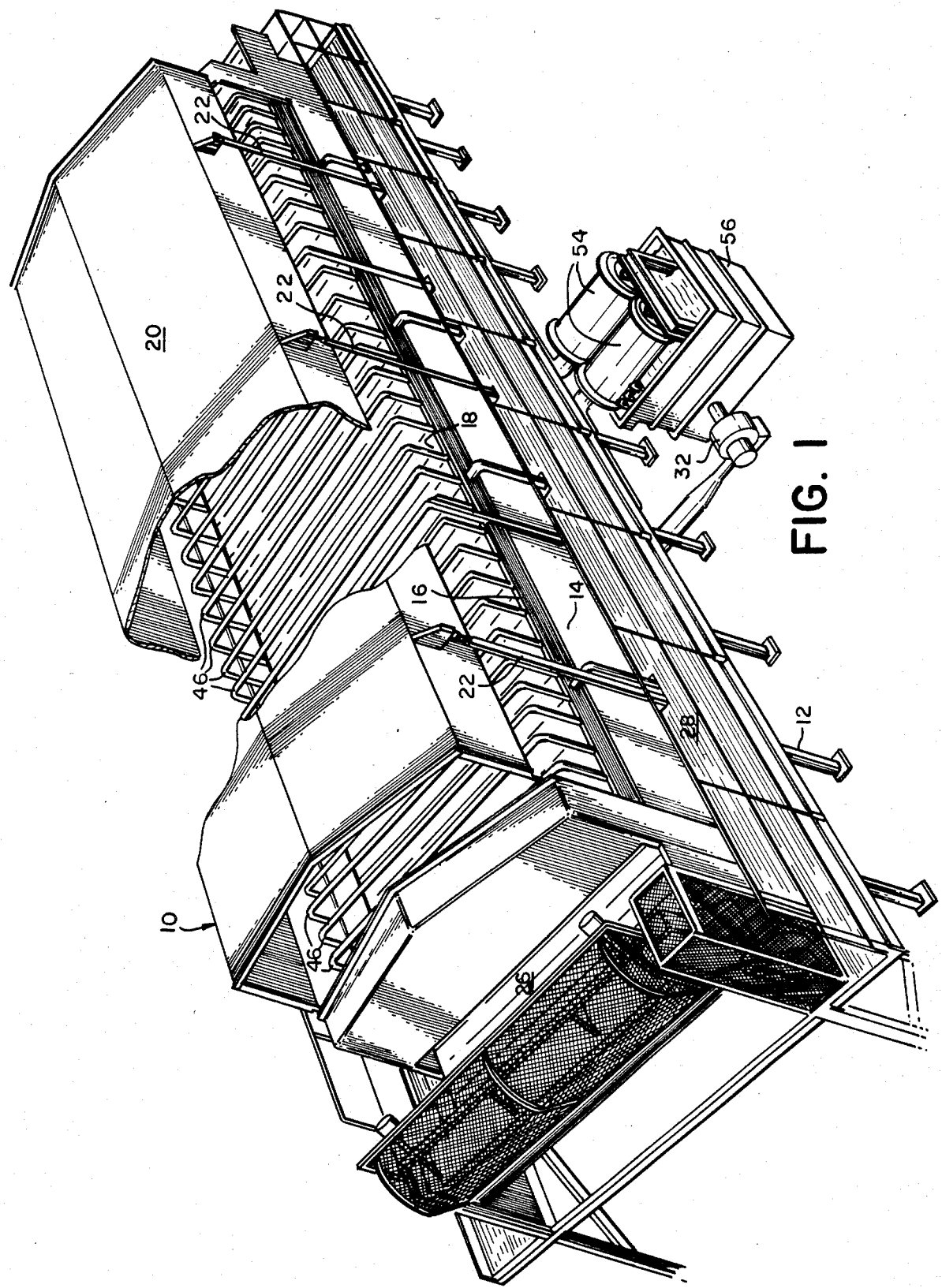
Figure 2:
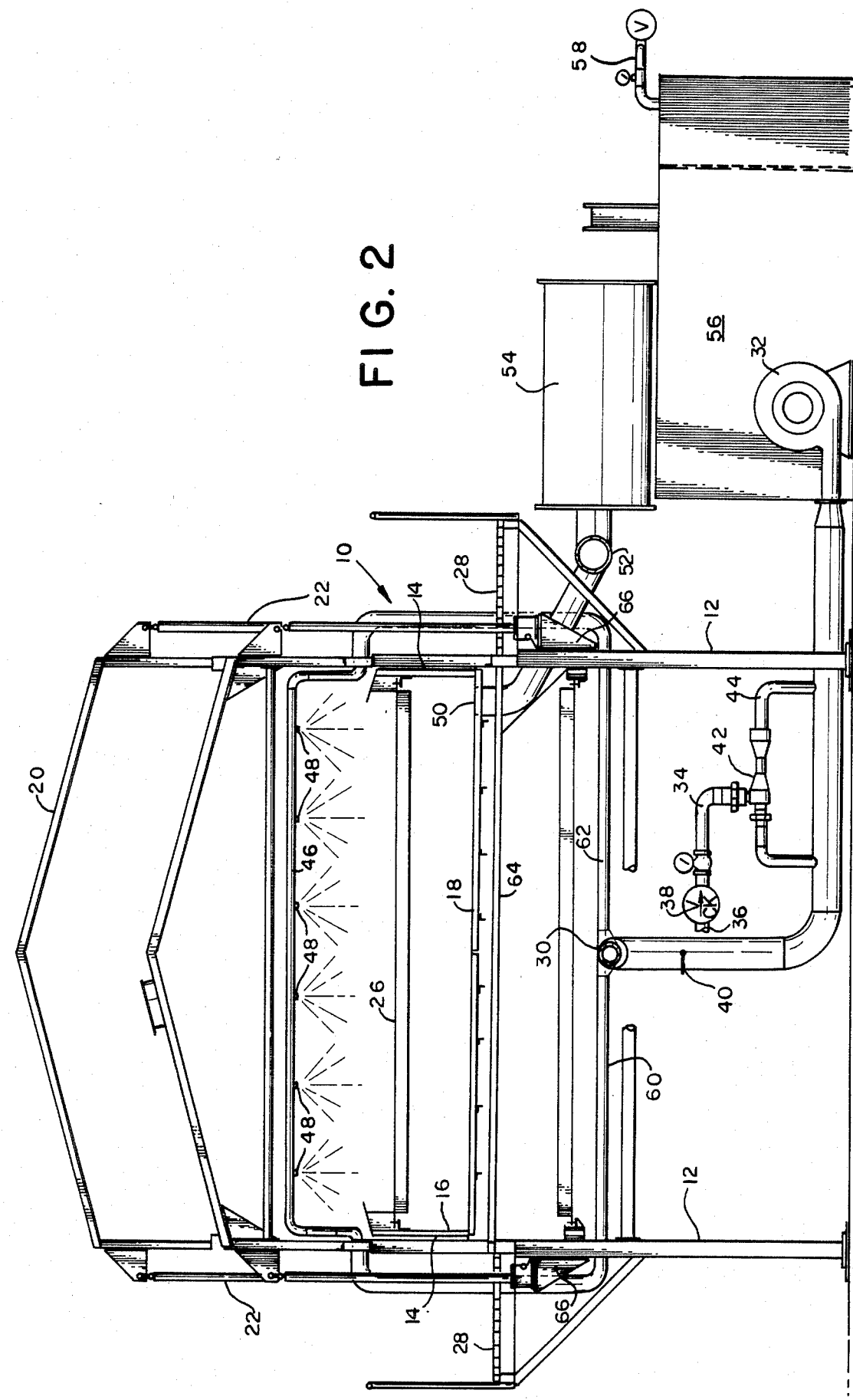
Figure 3:
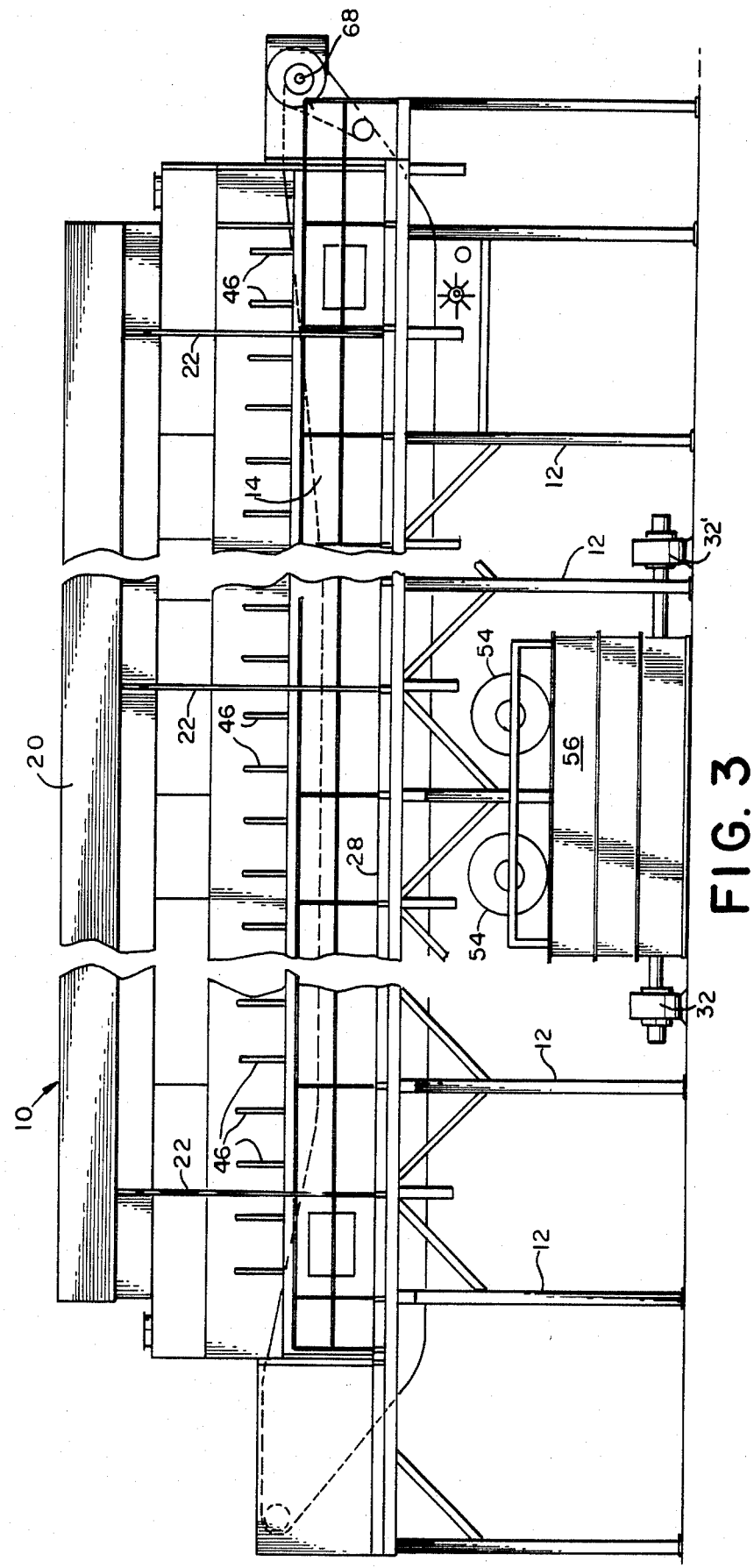

United States Patent [19]

Blemlek

[11] Patent Number: 4,525,371

[45] Date of Patent: Jun. 25, 1985

[54] LECITHINATED NOODLES AND PROCESS FOR MANUFACTURE THEREOF

[75] Inventor: William A. Blemlek, Pequannock, N.J.

[73] Assignee: Thomas J. Lipton, Inc., Englewood Cliffs, N.J.

[21] Appl. No.: 436,391

[22] Filed: Oct. 25, 1982

[51] Int. Cl.³ .................................................. A23L 1/16
[52] U.S. Cl. ..................................... 426/557; 426/662
[58] Field of Search .............................. 426/557, 662

[56] References Cited

U.S. PATENT DOCUMENTS

| | | | |
|---|---|---|---|
| 1,883,653 | 10/1932 | Epstein | 426/557 |
| 1,971,886 | 8/1934 | Votaw et al. | 426/555 |
| 2,334,401 | 11/1943 | Fitzpatrick | 426/662 |
| 2,632,705 | 3/1953 | Scharf | 426/662 |
| 4,044,165 | 8/1977 | Baumann | 426/557 |
| 4,098,906 | 7/1978 | Hisaki et al. | 426/94 |
| 4,178,393 | 12/1979 | Gregersen | 426/653 |
| 4,243,689 | 1/1981 | Kokeguchi et al. | 426/557 |
| 4,243,690 | 1/1981 | Murakami et al. | 426/557 |
| 4,394,397 | 7/1983 | Lometillo et al. | 426/557 |

*Primary Examiner*—Raymond Jones
*Assistant Examiner*—Elizabeth A. King
*Attorney, Agent, or Firm*—Brumbaugh, Graves, Donohue & Raymond

[57] ABSTRACT

Egg noodles with high lecithin content are made by (a) mixing eggs with lecithin having a high level of purity to form a slurry, (b) blending the slurry with flour to produce a dough of bread-like consistency, (c) extruding the dough to form noodles (d) cutting the noodles and (e) drying the noodles.

7 Claims, No Drawings

LECITHINATED NOODLES AND PROCESS FOR MANUFACTURE THEREOF

This invention relates to egg noodles having a high level of lecithin, hereinafter termed lecithinated noodles, and to a method of making the noodles. In a preferred embodiment, egg noodles having a high level of lecithin are made by combining pure lecithin with fresh egg solids and then blending the resulting slurry with flour to form a dough of bread-like consistency. Thereafter, the dough is extruded, cut and dried.

The lecithinated egg noodles of this invention have a color and texture similar to that of non-lecithinated egg noodles. Additionally, when the noodles of this invention are cooked with vegetables and/or meat stock, their taste compares favorably with non-lecithinated egg noodles.

BACKGROUND OF THE INVENTION

Recent medical evidence that the normal dietary constituent, lecithin, may be of value in treating certain health problems and the growing popularity of health foods has increased the need for palatable foods that contain a high level of lecithin.

In pharmaceutical products, lecithin is used as a source of choline and inositol which are regarded as members of the B-Complex vitamins. See Soybeans and Soybean Products, Markley (ed.) 610 (1951). The choline in lecithin is a source of labile methyl groups, and inasmuch as it contains no cholesterol it is used for its lipotropic effect in treating hypercholesterolemia, arteriosclerosis and psoriasis. Lecithin is an essential factor in the prevention of fatty degeneration of the liver. Lecithin assures a better utilization in the body of the fat-soluble Vitamin A, carotene and Vitamin D. See Markley 628. An additional reference which discusses the usefulness of lecithin in the diet is Nutrition and the Brain, Volume 5, pp. 253–441, (1979), Choline and Lecithin in Brain Disorders, Barbeau, Growdon and Wurtman (eds.); Raven Press.

Lecithin has been used in food products as an emulsifier. U.S. Pat. No. 4,044,165 to Bowman describes a process for preparing precooked pasta products wherein 5 percent lecithin is added directly to the semolina. The lecithin acts as an emulsifier to prevent expansion of the dough at the exit of the drawplate or die.

U.S. Pat. No. 1,971,886 to Votaw et al. discloses a process for preparing a cake composition containing more sugar than flour wherein about 0.1 to 0.3 percent lecithin is added.

U.S. Pat. No. 2,632,705 to Scharf discloses a dried composition wherein lecithin is combined directly with a gelatinized, starchy material and particularily with cereal, bean, fruit, nut or seed flour.

Because of its physical properties, finding a carrier for lecithin has always been a difficult problem. U.S. Pat. No. 2,334,401 to Fitzpatrick et al. teaches the mixing of lecithin with a granular water soluble material such as table salt or cane, corn or beet sugar to form a greasy mass and then grinding the mixture to distribute the lecithin uniformly. However, Fitzpatrick et al. disclose that the method is effective for distributing only small amounts of lecithin in a large amount of food. Further, this method is inappropriate for use in foods not containing salt or sugar or for use in diets which restrict salt and sugar intake.

SUMMARY OF INVENTION

It has now been discovered that egg noodles containing a high level of lecithin may be produced by mixing the lecithin first with eggs to produce a slurry, and then blending the slurry with flour to produce a bread-like dough. The dough is thereafter extruded to form noodles. For the purpose of this invention, a high level of lecithin means that level provided by adding lecithin having purity of approximately 60–90 percent, preferably 80–90 percent in quantities sufficient to produce egg noodles with a lecithin content of at least about 20 percent by weight of the dry solids. After the noodles are extruded they may be cut into pieces and dried to a uniform moisture. Furthermore, in one preferred embodiment, egg noodles with high lecithin content are produced by first combining the lecithin with a mixture of frozen whole eggs and whole egg solids to form a slurry. Thereafter, the slurry is mixed with flour to form a dough. The resulting dough is extruded and dried.

The noodles of this invention may be used in soups or in casseroles. In a preferred embodiment the noodles may be puff-dried and thereafter eaten as a snack. Additionally, soups, casseroles and snack foods prepared with the egg noodles of this invention have high nutritional value and have the same organoleptic properties as regular egg noodles.

Thus, an egg noodle with flavor characteristics and appearance similar to that of ordinary egg noodles may be prepared by first mixing highly purified lecithin with eggs to form a slurry, by mixing the slurry with flour and thereafter extruding the dough which is formed, cutting the noodles and drying them. The noodles which are formed may be mixed with a soup base and cooked to form a soup or combined with seasoning and casserole ingredients and cooked until a casserole is prepared. The soup or casserole which is formed will have taste characteristics which are comparable to those soups and casseroles formed with ordinary egg noodles. The high lecithin content noodles produced in this manner will have an appearance similar to ordinary egg noodles.

One of the advantages of the present invention is that it provides a palatable means of introducing high quantities of lecithin into a diet where such has been prescribed for health reasons. Studies done by the Massachusetts Institute of Technology have indicated that ingestion of high levels of lecithin, as by eating lecithin enriched foods, is helpful in correcting certain health problems.

DESCRIPTION OF THE INVENTION

The starting material for use in the process of this invention and for preparation of the product of this invention is highly purified lecithin. Lecithin having purity of about 80 to 90 percent is preferred. It should be understood, however, that lecithin with a degree of purity as low as about 60 percent lecithin would be acceptable as the starting material for this invention. Soy lecithin is preferred; however, lecithin from other sources is acceptable.

The product of this invention is an egg noodle containing egg yolk solids at a level of at least about 5 percent by weight, expressed as dry egg solids present in the finished dry weight of the product. The egg solids can be supplied as fresh eggs, dried egg yolk, liquid eggs or frozen eggs which have been thawed or some combination thereof.

In the initial step of the process of this invention the egg is blended with the lecithin which has been cut into small cubes to ease slurry preparation. The lecithin and eggs are mixed until a slurry is formed.

The lecithin-egg slurry is mixed with flour. The slurry and flour mixture is then blended until a dough of bread-like consistency is formed. The resulting mixture is dense and cohesive and not granular.

The dough is then fed into an extruder to form noodles, and the extruded noodles are cut into desired lengths. Thereafter, the noodles may be dried to a constant moisture. A moisture in the range of about 4.5 to 6.5 percent is preferred.

Extruding and drying of noodles are processes well known in the art. It should be understood that the noodles of this invention may be extruded and dried by any acceptable extruding and drying means. Therefore, it should be understood that for commercial production of the noodles of this invention any commercially acceptable means of producing extruded dried noodles may be employed. Additionally, it should be understood that the product of this invention may be extruded and cut into several desirable conventional pasta shapes.

After the lecithinated noodles are produced as described herein, they may be cooked as ordinary egg noodles. Alternately, the egg noodle of this invention may be mixed with seasoning, dried vegetables, meat and/or poultry and packaged as a soup base or as a casserole base. The consumer may then cook the noodles of this invention in the same manner as regular dried soup or casserole base. The noodles of this invention will produce a soup or casserole product which is comparable to a soup or casserole product using regular egg noodles.

Alternately, the noodles of this invention may be puff-dried in a microwave oven to form a dry snack.

The following examples illustrate but do not limit the invention.

EXAMPLE I 26.8 grams of whole frozen egg were thawed and blended with 20.3 grams of soy lecithin which was about 85 percent pure in two aliquots in a large Waring Blender. The lecithin had been cut into one inch cubes to ease slurry preparation.

52.11 grams of a mixture comprising equal parts of durum and hard wheat flours were mixed with 0.8 grams of whole egg solids in a Hobart Mixer. Both aliquots of the egg-lecithin slurry were then added to the dry ingredients in a Hobart Mixer while the mixer was stopped. The Mixer was then set to Speed No. 2 and turned on for approximately two minutes.

Thereafter, the Mixer was stopped, set on Speed No. 3 and the dough was blended for approximately three minutes. The resulting material was a dense and cohesive dough having the consistency of bread dough.

The dough was hand fed into an Ambretti extruder so as to feed the screw properly and noodles were extruded. The resulting noodles were cut to approximately one inch and air conveyed onto drying trays.

The noodles were dried in Proctor and Schwartz dryers. The initial drying conditions were about 46° C.-51° C. for about 3.5 to 4 hours. Redrying was performed at about 76° C.-83° C. for about 10-20 minutes depending on moisture content. A final moisture of about 4.5 to 6.5 percent was achieved. The noodles were then packaged. Each package contained 40 grams of seasoning and meat/poultry mix and 6.5 grams of noodles. To prepare the noodles for eating, the contents of each package was brought to a boil with 9 ounces of water and allowed to simmer while covered for six minutes.

EXAMPLE II

A dry mixture of the following ingredients was prepared: 0.8 grams whole egg solids and 52.1 grams of a flour comprising about 50 percent durum patent flour and about 50 percent winter wheat flour. The dry mixture was set aside. An egg-lecithin slurry of the following ingredients was prepared: 20.3 grams of soy-lecithin having a lecithin content of about 85 percent and 26.8 grams of whole frozen egg which had been thawed.

The egg and lecithin were blended in a large Waring Blender. The lecithin had previously been cut into one inch cubes to ease slurry preparation.

The egg-lecithin slurry was added to the dry ingredients while the Hobart Mixer was stopped. The Mixer was then set at Speed No. 2 and turned on for approximately two minutes.

The Mixer was stopped and then set on Speed No. 3 and the dough was blended for approximately two to three minutes. The resulting dough was dense and cohesive having the consistency of bread dough.

The dough was hand fed into an Ambretti extruder. The noodles were cut into 3-4" lengths and puff-dried in a microwave oven. The puffed noodles were packaged to be eaten as a dry snack. A single serving of 39.7 grams contained about 8 grams of lecithin.

I claim:

1. A process for producing egg noodles comprising the steps of mixing eggs with lecithin of about 60-90% purity under conditions of time and temperature sufficient to produce a slurry, blending the slurry with flour under conditions of time and temperature sufficient to produce a dough of bread-like consistency, extruding the dough to form noodles, cutting the noodles into pieces and drying the noodles to a uniform stable moisture.

2. A process for producing egg noodles comprising the steps of:
   (a) mixing lecithin having purity of about 60-90 percent with egg to produce a slurry;
   (b) blending the slurry with flour to produce a dough of bread-like consistency;
   (c) extruding the dough to form noodles;
   (d) cutting the noodles into pieces; and
   (e) drying the noodles to a moisture content of about 4.5 to 6.5 percent, the noodles containing at least about 20 percent by weight of lecithin and at least about 5 percent by weight of whole egg solids.

3. A process for producing egg noodles according to claim 1 wherein the lecithin has a purity of about 80-90 percent and is used in an amount sufficient to produce egg noodles having a lecithin content of at least about 20 percent of the dry solids.

4. A process for producing egg noodles according to claim 1 wherein the extruded noodle is puff-dried to form a dry snack food.

5. Egg noodles comprising egg solids, flour and a lecithin content of at least 20 percent by weight of the dry solids.

6. Egg noodles according to claim 5 wherein the egg solids are selected from the group consisting of whole fresh eggs, whole frozen eggs, powdered eggs, whole egg solids or combination thereof and wherein the egg solids are present at a level of at least about 5 percent by weight.

7. Egg noodles according to claim 6 wherein the flour is selected from the group consisting of durum, hard wheat or a blend thereof.

* * * * *